United States Patent Office 3,350,713
Patented Oct. 31, 1967

3,350,713
EQUIPMENT FAULT INDICATOR FOR WIRELESS POSITION LOCATING SYSTEMS
Pierre Laurent, Fontenay-aux-Roses, France, assignor to Compagnie Generale de Geophysique, Paris, France, a corporation of France
Filed Dec. 3, 1964, Ser. No. 415,739
Claims priority, application France, Dec. 13, 1963, 957,082
2 Claims. (Cl. 343—105)

ABSTRACT OF THE DISCLOSURE

Apparatus for indicating the substitution of a short-life power supply for a main power supply or the failure of a generating system for a storage battery in a position locating system wherein two unmanned and fixed stations transmit unmodulated carrier signals to a movable station whose position is to be located and to a third fixed station which modulates a carrier with the beat between the first said carrier signals and transmits the result to the movable station for phase comparison with the beat between the directly received carrier signals. Said apparatus provides for respective periodic interruptions of the respective carrier signals.

Drawing

Figure 1:
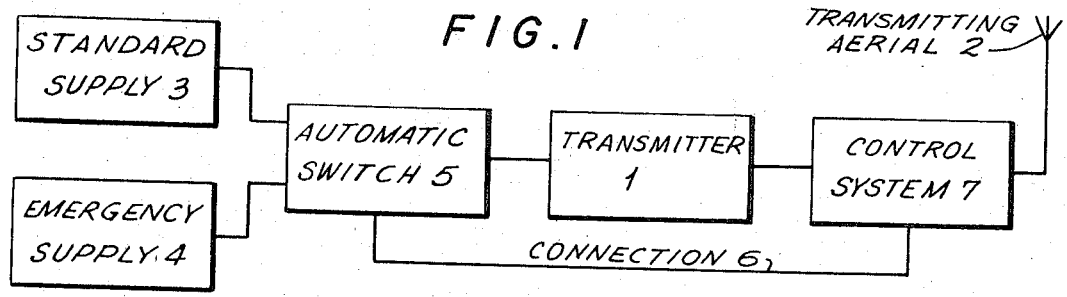
Figure 2:
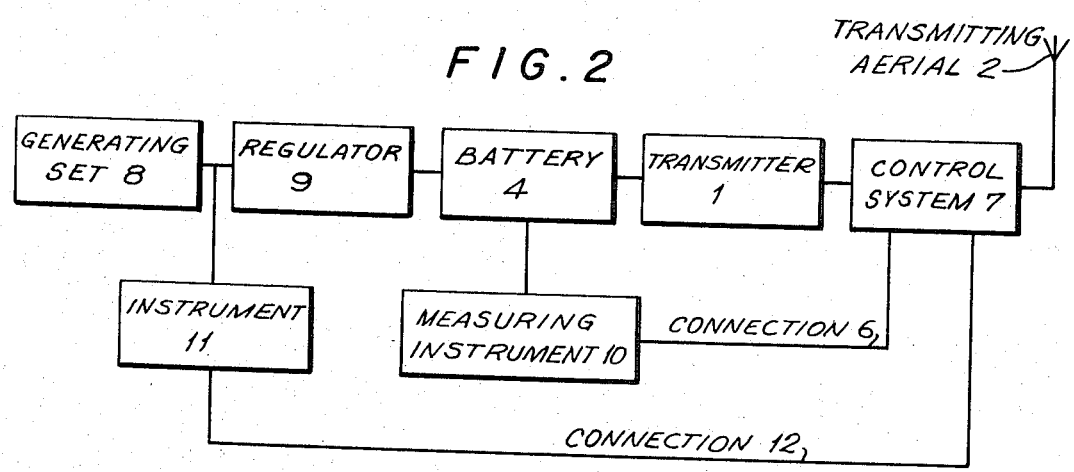
Figure 3:
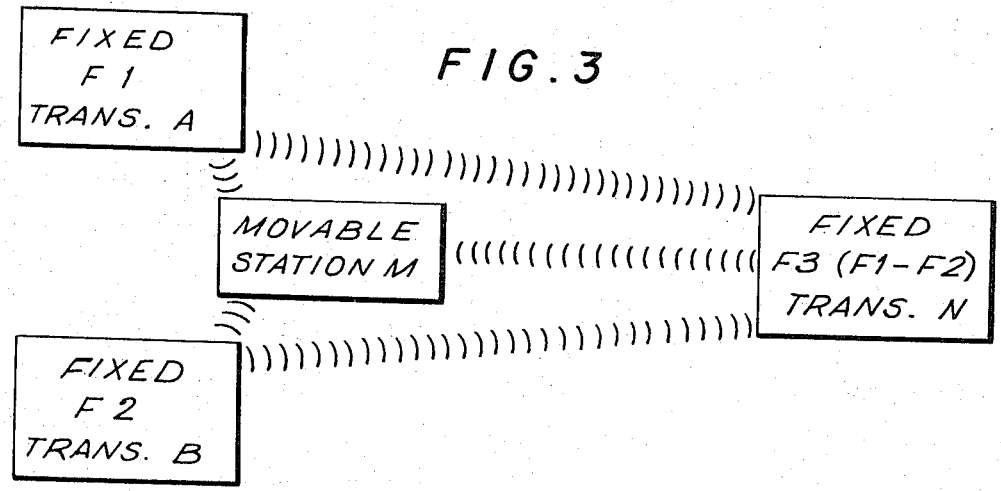

FIGURE 1 is a block diagram of a first embodiment of the invention;
FIGURE 2 is a block diagram of a second embodiment of the invention; and
FIGURE 3 illustrates the overall system in which the invention is embodied.

Detailed Description

This invention relates to equipment fault indicating or locating systems.

This invention relates to equipment fault indicating or alarm systems for wireless position locating systems. It is a well-known fact that the difference between the distances separating two stationary points the locations of which are known from a movable station can be measured through the following procedure:

If a first stationary point A (FIG. 3), produces a first pure or unmodulated electromagnetic wave at a frequency F1 while a second stationary point B, produces a second pure or unmodulated wave at a frequency F2 differing from F1 by a low frequency value, there is produced a signal whose frequency is $F2-F1=f$, $f$ being a frequency of a low value.

Furthermore, if a control station N located at a stationary point receives both waves F1 and F2 and produces beats therebetween, which leads to the production of frequency $f$, this can serve for modulating in any suitable manner a third wave at a frequency F3 transmitted by said control station N.

A movable station M which is to be located with reference to the stationary points A and B is provided with a receiver operating on two channels.

The first channel is designed for the reception both of F1 and F2 so as to produce beats between said waves, which leads to the production of the first beat frequency $f$. The second channel receives the frequency F3 from N and detects it, which leads to the production of a second beat frequency $f$ equal to the first beat frequency. A phase-meter measures the differences in phase between said two waves thus obtained at the same frequency $f$.

Said difference in phase forms, as is well-known in the art, a measurement of the difference between the distances separating the movable station M from the stationary points A and B.

Generally speaking, the transmitting stations and in particular the transmitters at the points A and B do not require the presence of a permanent staff, that is they operate automatically. The electric energy is fed to them normally from the electric mains, if any, or else by a generating set. The transmitters at said points are also provided with an emergency supply constituted generally by storage batteries while an automatic device insures the connection with the storage batteries when for any reason the normal supply fails.

In such a case, the storage battery is gradually discharged and after a lapse of time and, in the absence of any outer intervention the wireless transmitter is no longer supplied with power.

The present invention has as an object the provision of an alarm system which allows an attendant, at any point of the area served by the radio-locating system referred to, to be warned of the stoppage of the operation of the normal supply and consequently of the impending discharge of the storage battery in the near future.

To this end, and in conformity with the present invention, an alarm system is adapted to cut off transiently in a systematic manner, preferably at uniform intervals of time, the pure waves produced normally by the transmitter at point A or B or else the modulated waves produced by the station N, the operation of said alarm system starting automatically as soon as the transmitter is provided with power by the emergency supply.

The attendant is provided with a conventional receiver similar to that used at the movable station and serving for defining a location or else he may be provided with a simple receiver which allows him to receive the waves from the points A and B and to obtain audible or optical signals at the beat frequency $f$. The cutting out of one of the waves produced leads to a cutting off of the frequency $f$ and this latter cutting off warns the attendant of the approaching end of the production of waves by one of the transmitters at A or B.

In order to allow the attendant to find which is the transmitter having trouble, according to a further feature of the invention, different rhythms of cutting off together with different characteristic data are provided for each transmitter. For instance, the point A may cut its transmission off once every two seconds while the point B cuts its transmission off once every 4 seconds and the failure of the control station N is generally detected by the receiver through the fact that its transmitter is the only one transmitting the frequency F3.

In FIG. 1, the point or transmitting station A (or B) includes a transmitter 1 feeding a transmitting aerial 2 while it is supplied with electric energy by a standard supply 3. An emergency supply 4 is adapted to feed the transmitter under control of an automatic switch 5 which normally connects the standard supply 3 with the input of the transmitter 1 and substitutes supply 4 when supply 3 fails.

According to the invention, the automatic switch 5 when it connects the supply 4 with the transmitter 1 energizes through the connection 6 a control system 7 of any suitable type inserted between the transmitter 1 and its aerial 2 and adapted to cut off during short intervals repeated at uniform intervals the waves radiated by the aerial 2. Any conventional bistable gating circuit may be employed for this purpose or any other well known switching circuit will suffice.

FIG. 2 illustrates a modification applicable in the case where the transmitter 1 is supplied solely by a battery 4, said battery being in its turn reloaded by a generating set 8 loading the battery 4 through a regulator 9.

According to the invention, a measuring instrument 10 measures the voltage across the terminals of the storage battery 4 and, in case of a lowering of the voltage of said storage battery below a predetermined value, for instance as a consequence of a failure of the generating set 8, the measuring instrument 10 energizes through the connection 6 the control system 7 cutting off the connection with the aerial in the manner already described.

Said control system 7 may also be energized upon failure of the generating set or more generally speaking, of the means loading the battery, which means may be constituted by the mains and a storage battery loading system. Said energization of the control system 7 may be started through the agency of a connection 12 by an instrument 11 detecting the stoppage of the operation of the loading means 8. Instrument 11 can be employed concurrently with instrument 10 although only one will probably operate at a time.

Of course, the intermittent gaps in the transmission are sufficiently short for the receiver at the movable station to continue supplying accurate measurements of phase differences while one or more stationary points radiate transmitted waves which are cut off transiently as provided by the present invention.

Numerous modifications may be made without departing from the scope of the invention as defined in the accompanying claims and in particular the control system 7 may be incorporated with the transmitter 1.

In the case of the diagram according to FIG. 1, it is also possible to control the control system 7 through the agency of the voltage across the terminals of the supply 4 when the latter is constituted by a storage battery.

What I claim is:

1. A position locating system comprising first and second fixed transmitting stations transmitting respective unmodulated carrier signals, a further fixed station determining the beat between said signals and transmitting a further carrier signal modulated by said beat, and a movable station adapted for comparing the phase between the beat of the first said signals which are directly received and the beat-modulated further carrier signals; and in said first and second stations: apparatus comprising at least one transmitter; said transmitter comprising first means for generating an unmodulated carrier wave, second means for transmitting said wave, third means for supplying electrical power to said first means, and fourth means responsive to an indication that said third means will lose its capability of supplying power, said fourth means being adapted to interrupt periodically the transmission by said second means thereby forming a warning signal consisting of a interrupted carrier wave, said third means including a battery coupled to said first means and said fourth means being sensitive to a decrease in output of said battery below a predetermined level to cause said interrupting.

2. A transmitter as claimed in claim 1 wherein said third means includes a generator charging said battery and wherein said fourth means is sensitive to a failure of said generator to cause said interrupting.

References Cited

UNITED STATES PATENTS

| | | | |
|---|---|---|---|
| 2,840,797 | 6/1958 | Derr | 325—2 X |
| 2,876,341 | 3/1959 | Likel | 325—2 |
| 3,047,678 | 6/1962 | Ingram | 325—2 X |
| 3,102,266 | 8/1963 | Wilson et al. | 343—105 |
| 3,130,277 | 4/1964 | Buotte et al. | 179—175.31 |

RODNEY D. BENNETT, *Primary Examiner.*

CHESTER L. JUSTUS, *Examiner.*

H. C. WAMSLEY, *Assistant Examiner.*